US006937182B2

(12) United States Patent
Lovberg et al.

(10) Patent No.: US 6,937,182 B2
(45) Date of Patent: *Aug. 30, 2005

(54) MILLIMETER WAVE IMAGING SYSTEM

(75) Inventors: John A. Lovberg, San Diego, CA (US); Vladimir Kolinko, San Diego, CA (US)

(73) Assignee: Trex Enterprises Corp., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/639,322

(22) Filed: Aug. 12, 2003

(65) Prior Publication Data

US 2004/0056790 A1 Mar. 25, 2004

Related U.S. Application Data

(63) Continuation-in-part of application No. 09/965,875, filed on Sep. 28, 2001.

(51) Int. Cl.[7] .............................................. G01S 13/00
(52) U.S. Cl. ........................... 342/22; 342/27; 342/179
(58) Field of Search ........................... 342/22, 27, 52, 342/179

(56) References Cited

U.S. PATENT DOCUMENTS 5,227,800 A * 7/1993 Huguenin et al. .......... 250/332
6,480,141 B1 * 11/2002 Toth et al. ................... 342/22
6,791,487 B1 * 9/2004 Singh et al. ................. 342/22
2004/0080448 A1 * 4/2004 Lovberg et al. ............. 342/22
2004/0140924 A1 * 7/2004 Keller et al. ................ 342/22

OTHER PUBLICATIONS

Sheen et al., "Three Dimensional Millimeter–Wave Imaging for Concealed Weapon Detection", IEEE Transactions on Microwave Theory and Techniques, vol.: 49 , Issue: 9, Sep. 2001.*

* cited by examiner

Primary Examiner—Ian J. Lobo
(74) Attorney, Agent, or Firm—John R. Ross

(57) ABSTRACT

A millimeter wave imaging system that includes at least one millimeter wave frequency scanning antenna for collecting frequency dependent beams of millimeter wave radiation from a narrow one-dimensional field of view. The collected radiation is amplified at the collected frequencies and the amplified signals are separated into frequency dependent bins with a tapped-delay beam-former. These bins are then sampled to produce a one-dimensional image of the antenna field of view. A two dimensional image of a target may be obtained by moving the target across the field of view of the scanning antenna. In a preferred embodiment the antenna is only 4.5 inches in length and constructed from WR-10 waveguide with inclined slots cut in one of the narrow walls at 79 mil spacings. This geometry creates a frequency-scanned antenna spanning a 20 degree vertical field of view over a 75.5–93.5 GHz operational band of the sensor, starting at approximately 1 degree below horizontal at 93.5 GHz and ranging to approximately 21 degrees below horizontal at 75.5 GHz. In this embodiment 64 of these antenna elements are arranged in four stacks of 16 antennas focused at about 18 inches to construct a portal contraband screener.

23 Claims, 7 Drawing Sheets

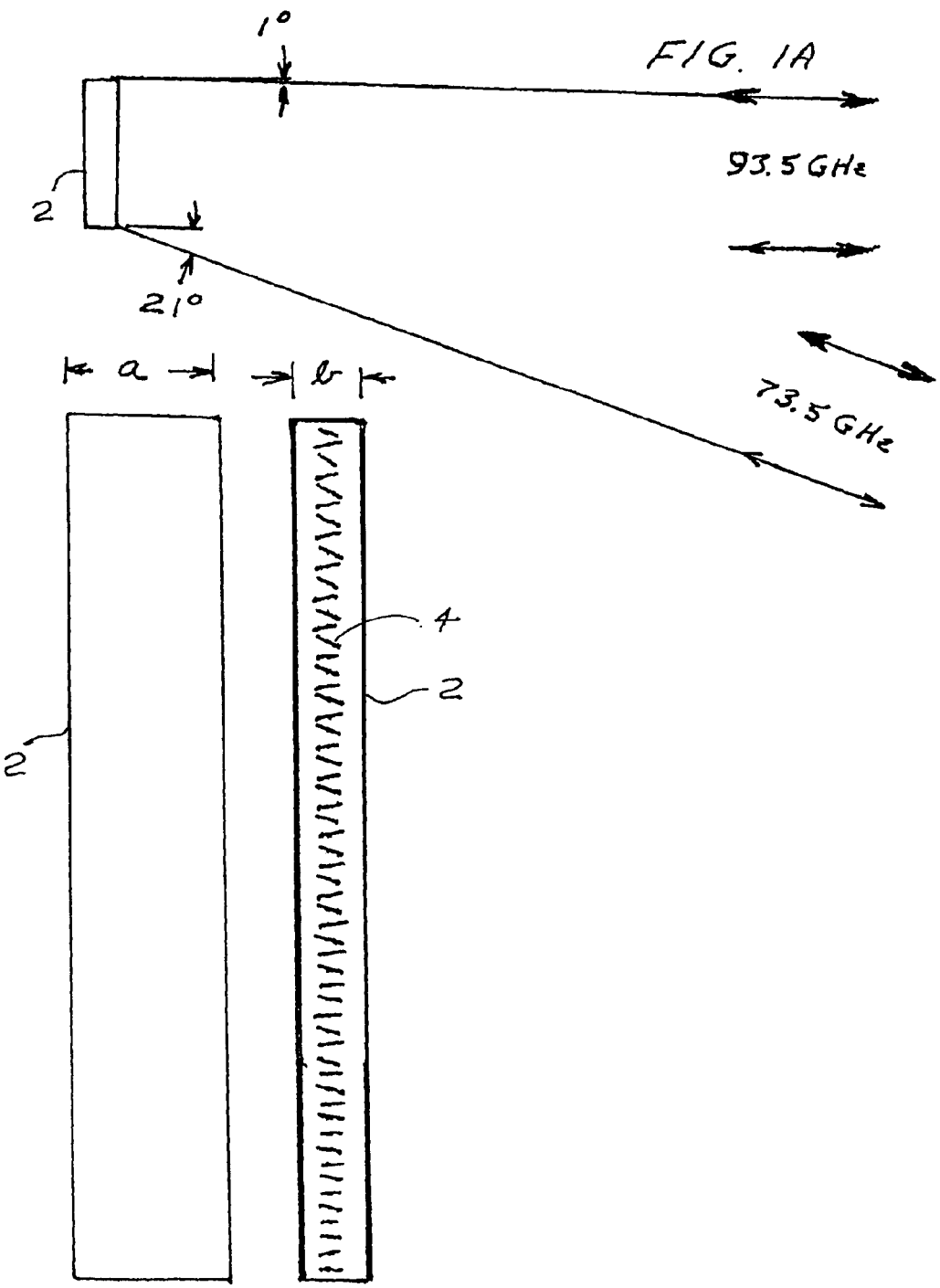

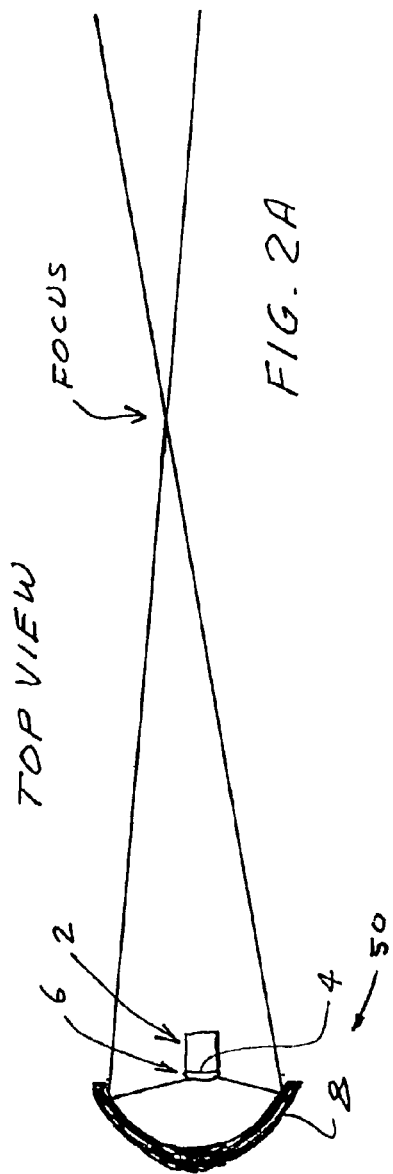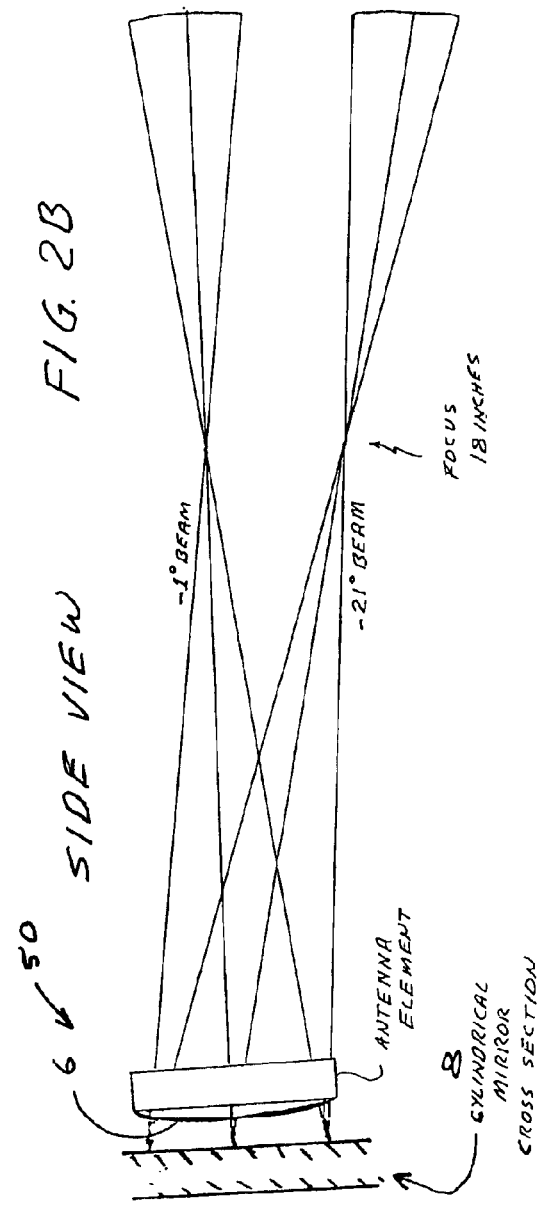

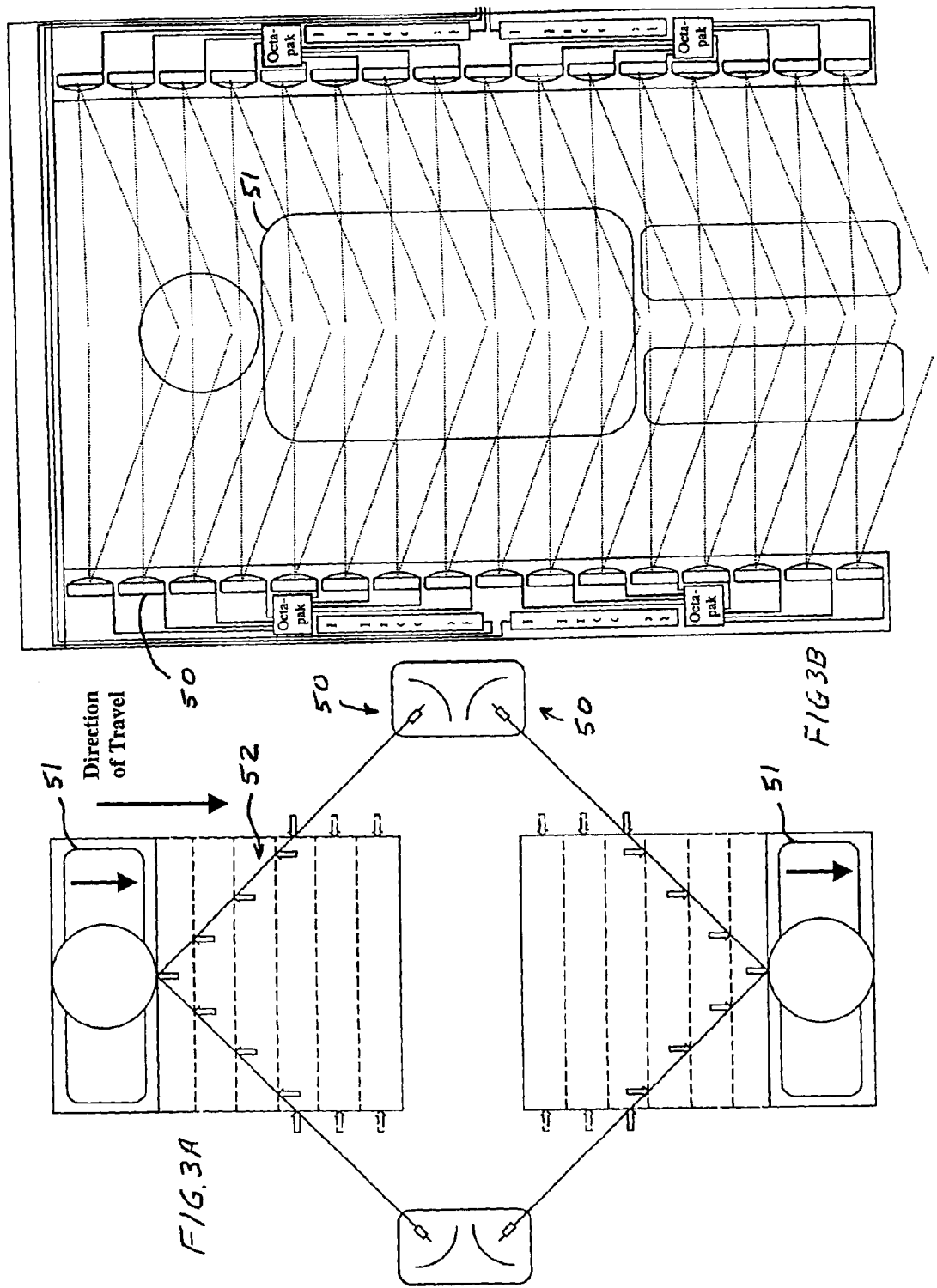

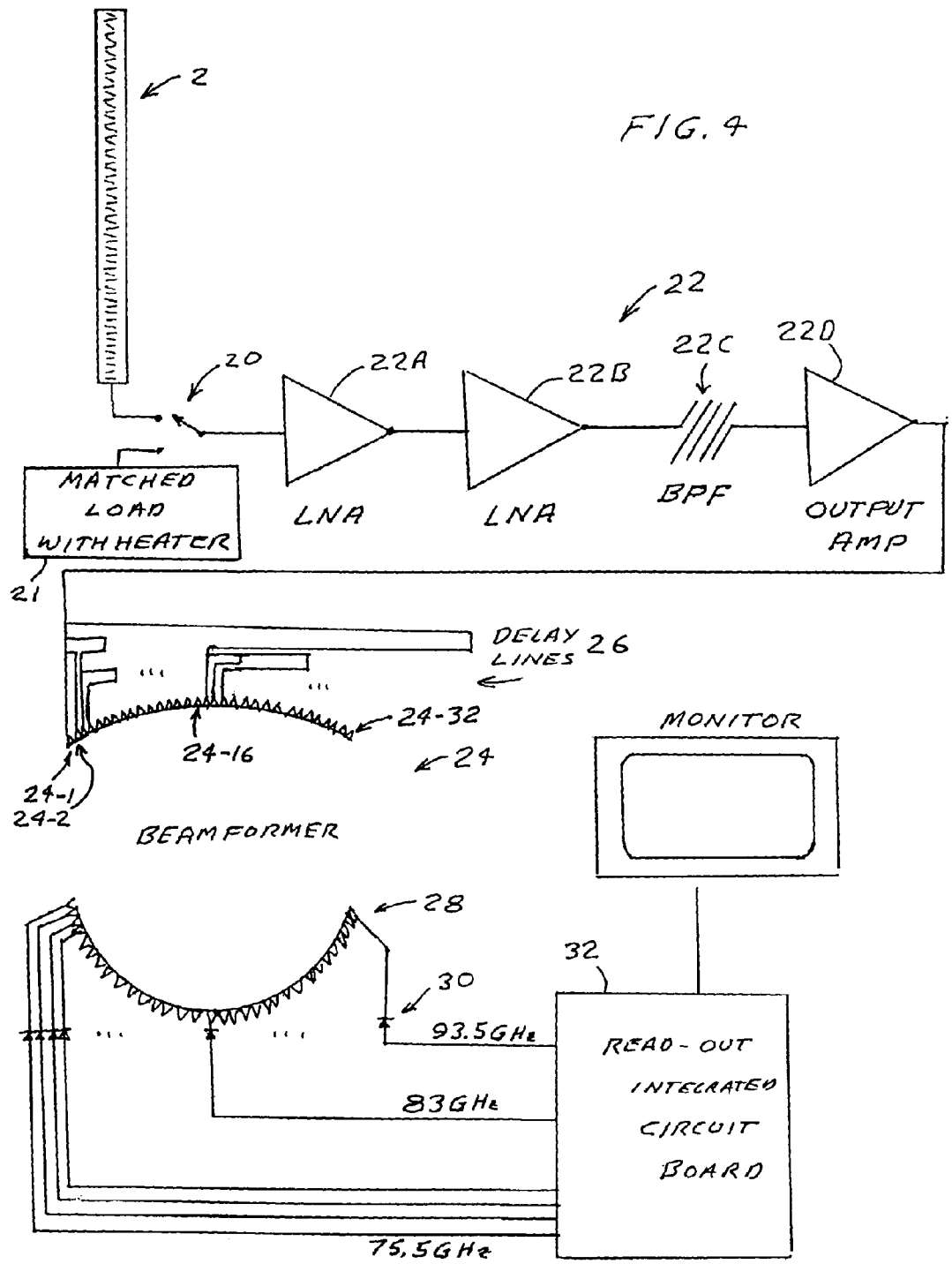

Modeling transverse resolution of an elliptical cylinder antenna at 85 GHz.
Transverse resolution defined as spot diameter in a section perpendicular to the beam axis at 50% of peak response.
Antenna diameter: 4.8 inches
Antenna height: 4.8 inches
Distance to the first focus: 4 inches
Distance to the second focus: 18 inches

US 6,937,182 B2

MILLIMETER WAVE IMAGING SYSTEM

The present invention is a continuation in part of U.S. patent application Ser. No. 09/965,875, filed Sep. 28, 2001 which is incorporated by reference herein. The present invention relates to imaging systems and in particular to millimeter wave imaging systems.

BACKGROUND OF THE INVENTION

Imaging systems operating at millimeter wavelengths (1 cm to 1 mm; 30 GHz to 300 GHz) are well known. These systems can be important because light at these wavelengths is not completely attenuated by substantial distances of fog or smoke, as is visible light. Light at millimeter wavelengths will also penetrate clothing and significant thickness of materials such as dry wood and wallboard. These millimeter wave imaging systems have therefore been proposed for aircraft to improve visibility through fog and for security applications for detection of hidden weapons and the like. Such systems are described in U.S. Pat. Nos. 5,121,124 and 5,365,237 that are assigned to Applicant's employer. The systems described in those patents utilize antennas in which the direction of collected millimeter wave radiation is a function of frequency. This type of antenna is referred to as a "frequency scanned" antenna. The collected millimeter wave light is analyzed in a spectrum analyzer to produce a one-dimensional image. In the systems described in the '124 patent the antenna signal is used to modulate an acousto-optic device (a Bragg cell) that in turn modulates a laser beam to produce a spectral image. In the systems described in the '237 patent an electro-optic module is modulated by the antenna signal and the electro-optic module in turn modulates the laser beam to impose the millimeter wave spectral information on a laser beam that then is separated into spectral components by an etalon to produce an image.

U.S. Pat. No. 4,654,666 describes an imaging system which includes a frequency scanning antenna and a spectrum analyzer for converting coded radiation distributions collected by the antenna into a time coded distribution so that a one-dimensional scene can be reproduced.

The systems referred to above are complicated and costly to construct. What is needed is a relatively low cost, easy to operate millimeter wave imaging system, especially for use in portal screening for contraband.

SUMMARY OF THE INVENTION

The present invention provides a millimeter wave imaging system that includes at least one millimeter wave frequency scanning antenna for collecting frequency dependent beams of millimeter wave radiation from a narrow one-dimensional field of view. The collected radiation is amplified at the collected frequencies and the amplified signals are separated into frequency dependent bins with a tapped-delay beam-former. These bins are then sampled to produce a one-dimensional image of the antenna field of view. A two dimensional image of a target may be obtained by moving the target across the field of view of the scanning antenna.

In a preferred embodiment the antenna is only 4.5 inches in length and constructed from WR-10 waveguide with inclined slots cut in one of the narrow walls at 79 mil spacings. This geometry creates a frequency-scanned antenna spanning a 20 degree vertical field of view over a 75.5–93.5 GHz operational band of the sensor, starting at approximately 1 degree below horizontal at 93.5 GHz and ranging to approximately 21 degrees below horizontal at 75.5 GHz. In this embodiment 64 of these antenna elements are arranged in four stacks of 16 antennas to construct a portal contraband screener. A narrow, rod-shaped cylindrical lens covers the waveguide slots at each element and vertically focuses the antenna beam 18 inches from the antenna. The antenna segments are aligned along one focal axis of a vertically oriented elliptical cylinder reflector, 4.5 inches across with the second, parallel focal axis of the reflector located 18 inches from the antenna. This arrangement gives a 2-dimensional beam focus at 18 inches, with an approximate depth of focus covering 14 inches at minimum range to about 29 inches at maximum range. The frequency-scan angular range corresponds to about 4.5 vertical inches at the minimum operational range of 14 inches. The horizontal and vertical resolution (half-power beam-width) at the center-band frequency of 84.5 GHz is about 1.57 degrees, or less than ½-inch at the 18-inch focus. Each of the four stacks of antennas is directed at regions of a portal to permit composite front, side and back millimeter wave imaging of persons passing through the portal. The fixed antenna elements provide the vertical scan and the passage of the person provides the horizontal scan.

BRIEF DESCRIPTION OF THE DRAWINGS

FIGS. 1A–1C show features of a one-dimensional frequency scanning slot antenna.

FIGS. 2A and 2B show techniques for focusing the antenna shown in FIGS. 1A–C.

FIGS. 3A and 3B show an arrangement 64 of the above antennas in a portal contraband scanner.

FIG. 4 shows electronic circuits for converting millimeter wave signals to images.

DETAILED DESCRIPTION OF PREFERRED EMBODIMENTS

Antenna Element

Figure 6:
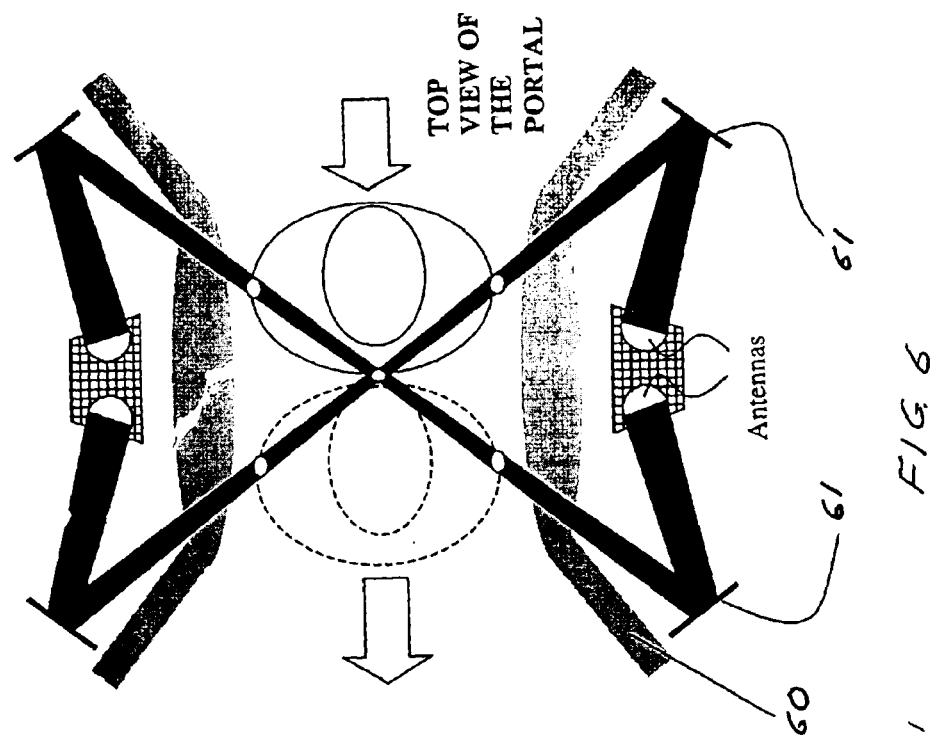
FIG. 6 shows an embodiment with a large depth of field.

FIGS. 1A, 1B and 1C are drawings showing features of a one-dimensional millimeter wave antenna according to aspects of the present invention. FIG. 1A shows the elevation field of view of the basic antenna element 2. Each antenna element 2 is constructed of WR-10 waveguide has exterior dimensions a=0.180", b=0.130" and interior dimensions a=0.100", b=0.050". In fabrication of the antenna, one of the narrow walls is thinned from 40 mils to 6 mils. Then, each WR-10 waveguide antenna has 57 inclined slots 4 cut into its narrow wall at a spacing of 0.079", which serve as emitting elements. The angle of the slots, and thus the coupling coefficient, increases from 9.66 degrees on the feed end to over 25 degrees at the load end to provide nearly constant field strength along the antenna length. The direction of the angle alternates, providing a "pi" phase shift between successive coupling slots. This geometry creates for a vertical mounted antenna a frequency scan spanning a 20-degree vertical field of view over a 75.5 to 93.5 GHz operational band of the sensor starting at minus 1 degree with the horizontal at 93.5 GHz and ranging to approximately 21 degrees below the horizontal below the horizontal.

Focusing the Antenna Element

In preferred embodiments the antenna element 2 shown in FIGS. 1A, 1B and 1C is focused to 18 inches as shown in FIGS. 2A and 2B. In this case a vertically oriented elliptical cylindrical mirror 8, 4.5 inches across has one of its focal lines at the center of slots 4 of antenna element 2 and its second focus at 18 inches from the antenna as shown in FIG. 2A. This focuses the antenna beam 8 in the horizontal direction at 18 inches. Also a narrow rod-shaped collimating lens 6 covers waveguide slots 4 and vertically focuses the antenna beam 8 at 18 inches from the antenna. At the frequency range of 93.5 to 73.5 GHz the wavelengths of the collected radiation are about 0.14 inch (3.6 mm) corresponding to the mid-frequency, 83.5 GHz. However, in this preferred embodiment the resolution element (as described in more detail below) is somewhat larger (in the range of about 0.5 inch) in both the horizontal and vertical directions. Antenna element 2 along with its focusing elements are designated as antenna element 50 in FIGS. 1A, 2B, 3A and 3B.

Antenna Electronics
Calibration and Amplification

In this preferred embodiment Dicke switching is used for calibration of the imaging system. This technique utilizes, as shown in FIG. 4 a front-end switch 20 that alternates between looking at the antenna signal and looking at a set temperature load 21. The front-end switch 20 switches at a rate of 3.84 kHz between the antenna and a load termination. The load can be heated by approximately 40K for one switching cycle. This allows the unit to perform a two-temperature calibration in real time, compensating for gain fluctuations in the amplifiers as well as temperature offsets. The switch itself is a W-band microwave monolithic integrated circuit (MMIC) PIN switch fabricated by M/A-Com with a transmission loss of 1.8 dB.

The front-end switch is packaged with, and feeds directly into, a front-end amplifier unit 22. This front-end amplifier unit consists of two low noise MMIC amplifiers 22A and 22B, band pass filter 22C and low noise MMIC output amplifier 22D. The amplifiers are required to have a wide bandwidth but maintain a low noise figure, as they set the noise temperature for the entire system. They operate over an 18 GHz bandwidth, from 75.5 GHz to 93.5 GHz. The first two amplifiers in the chain 22A and 22B have a noise figure of approximately 4 dB over the 18 GHz band and a gain of about 19 dB. Band pass filter 22C separates these amplifiers from the third amplifier 22D that is of a slightly different design. The third amplifier 22D, the output amplifier, is tuned for a gain of about 22 dB and is capable of output powers of up to 1 mW before compressing. Once packaged, the entire gain stage has approximately 53 dB of gain and a noise output power of −11 dBm, with a noise figure averaging 7 dB. This includes losses from the filter and the transitions. Thus, each amplifier channel 22 provides 53 dB of gain, as well as an integrated matched load with a heater, and PIN switch for in-situ two-temperature flat field calibration. The MMIC amplifiers and the band pass filter are preferably fabricated using a co-planer waveguide design on an indium phosphide substrate.

Tapped Delay Beamformer

This broadband amplified antenna power is fed into a tapped-delay beamformer as shown in FIG. 4 for decomposition into frequency bins representing a vertical frequency image of the antenna field of view. Delay lines 26 transmit the amplified antenna signal into 32 signal ports of beamformer 24. Beginning at port 24-1 at the left side of beamformer 24, the signal to each port is delayed by 36 ps (relative to its left side neighbor port). The 36 ps delay is equivalent to three wavelengths at centerband of 83.5 GHz. (The millimeter wave frequency of 83 GHz corresponds to a wavelength of about 3.6 mm and light travels that far in about 12 ps.) Thus, a signal arriving at port 24-1 at time 0 would also arrive at port 24-2 at time 36 ps, would arrive at port 24-16 at time 576 ps and would arrive at port 24-32 at 1.152 ns. The series of 32 taps samples a total time interval of 1.152 nanoseconds, yielding a frequency resolution of 870 MHz for the beamformer. (The frequency resolution for these beamformers is the inverse of the total time spread; so in this case 1/1.152 ns=870 MHz.) The beamformer sorts the 18,000 MHz broadband signal from the antenna into 32 frequency bins at an average separation of 580 MHz, thus over sampling the vertical focal plane by about 2.4X relative to the 1400 MHz bandwidth of each antenna beam. (The frequency separation is 18,000 MHz/31=580 MHz, and the beamwidth of the antenna beams is approximately equal to the inverse of the time [about 0.71 ns] for light to traverse the antenna element.) Losses in the delay line, the beamforming lens, and input transition, as well as bandwidth splitting losses drop the power level at each lens output to about −36 dBm. A set of 32 sensitive detector diodes 30 integrates this power in the 32 frequency bins for each channel to provide a voltage signal corresponding to the intensity of the millimeter wave light collected by the antenna element at each of the 32 frequency ranges. The voltage signal from each of these diode signals is then read out by multiplexing readout integrated circuit chips on readout integrated circuit board 32.

The beamformer is implemented in a low loss dielectric, such as polypropylene, with smooth copper cladding. The delay lines 26 are created at very low cost with a lithographic etching that creates the circuit pattern, which is then sandwiched between two ground planes in a heated press. In preferred embodiments, the smoothness of the copper making up the inside surface of the delay lines is extremely important. Applicants have discovered that they could reduce the losses in these lines from 1.2 dB/inch to about 0.5 dB per inch by requiring that the copper surface roughness not exceed 300 nanometers. Prior art microwave surface roughness specifications were 1400 to 2900 nanometers. As explained above, the signals from these 32 taps are launched into beamforming lens 24, which steers the beam into one of 32 output ports 28 based upon the signal frequency.

Portal Contraband Screener

In a preferred embodiment of the present invention shown in FIGS. 3A and 3B 64 antenna elements of the type discussed above are utilized to provide a portal contraband screener. In this preferred embodiment four sets of 16 vertically stacked antenna elements 50 are arranged to monitor persons passing through a portal preferably on a horizontal escalator at a known velocity of about 1.5 feet per second. The stacks are 80 inches high with two of the stacks 10A and 10B arranged to view the person's front and side and two of the stacks 10 C and 10 D arranged to view the person's side and rear all as shown in FIGS. 3A and 3B.

As a person 51 approaches the portal, which is about 41 inches wide; he/she enters the area of focus at a distance equal to roughly half the portal width (20.5 inches) from the portal centerline. At this range the forward-looking imaging antennas in stacks 10A and 10B are focused on the subject's front midline. As the person moves closer to the portal, the sensor foci sweep outward from the midline as indicated at 52 to generate a full 2-D image of the front and sides of the person. At the nominal travel speed of 1.5 feet per second, the antenna beam moves through one resolution element every 39.2 milliseconds. The imager reads out at 30 Hz, slightly over sampling the horizontal plane. In one second, as the person moves forward by 18 inches, the two antennas combine to record 60 columns of image pixels surrounding the front and two sides of the subject, separated horizontally by less than a quarter-inch projection. As the person leaves the portal, a second pair of antennas in stacks 10 C and 10 D images his/her back and sides in the same manner.

Electronic Features of the Contraband Screener

In this embodiment, the 16 antenna elements making up each antenna column feed 16 receiver channels, which are configured into two 8-channel packages ("octapaks"). These octopaks include an amplifier set and beamformer for each antenna. The amplified signals from the antenna elements are processed as a pair of images, one representing the front and sides of the person and the other representing the sides and rear of the person passing through the portal. In this preferred embodiment the sensors operate at a 30 Hz rate, producing 30 images per second. If we set the passage so that the image time for both front and rear images take one second each, both front and rear images will each contain 60 pixels in the horizontal direction. For the vertical direction, each of the 16 antenna elements in each column produces 32 angular beams for a total of 512 angular beams. These beams will be equally spaced in the vertical direction over 80 inches only at about 14 inches from the antenna stacks and will overlap beyond about 14 inches. Thus, both the front and rear images will each contain about 60 pixels across and 512 pixels high, and the images will produce a wraparound view of the person traversing the portal. The pixel size is about 0.5 inch in the horizontal direction and about 0.16 inch in the vertical direction at a range of 14 inches from the stacks. For those portions of the person located substantially farther from the antenna stacks than 14 inches, the pixel data should preferably be modified with computer software to accommodate the overlap to produce the wrap-around images.

Each of the two octopaks in each column holds eight switches and gain stages with WR-9 inputs. Each octopak includes connections for power and control signals and plenty of shielding to prevent feedback in the gain stage. Each octopak measures 1.5" long, 0.825" wide, and weighs 2.25 oz.

Background and Illumination

When a person is not passing through the portal, the antenna arrays have nothing within their focal area and instead receive signal from a broad area beyond the focal region. This area can be coated with millimeter absorptive foam at ambient temperature. The foam acts as a blackbody at millimeter wave frequencies, emitting a fixed, broadband signal to the antennas. If the foam temperature is less than the temperature of a human body, the foam provides a good contrast to a person passing through the detector. This improves the clarity and sharpness of the generated images. Also, in preferred embodiments contour contrast can be added to the images of the persons being screened by providing a cold surface above the portal that would be a source of low temperature thermal radiation. Therefore, millimeter radiation in the band detected by the antenna elements that is reflected off the person after being emitted from the cold source will be very small compared to reflected radiation from other surrounding warmer sources. As a result the scanner will see substantial contrasts on the persons scanned depending on the angular orientation of various portions of his body, his clothing and potential contraband.

Other Embodiments

Figure 5:
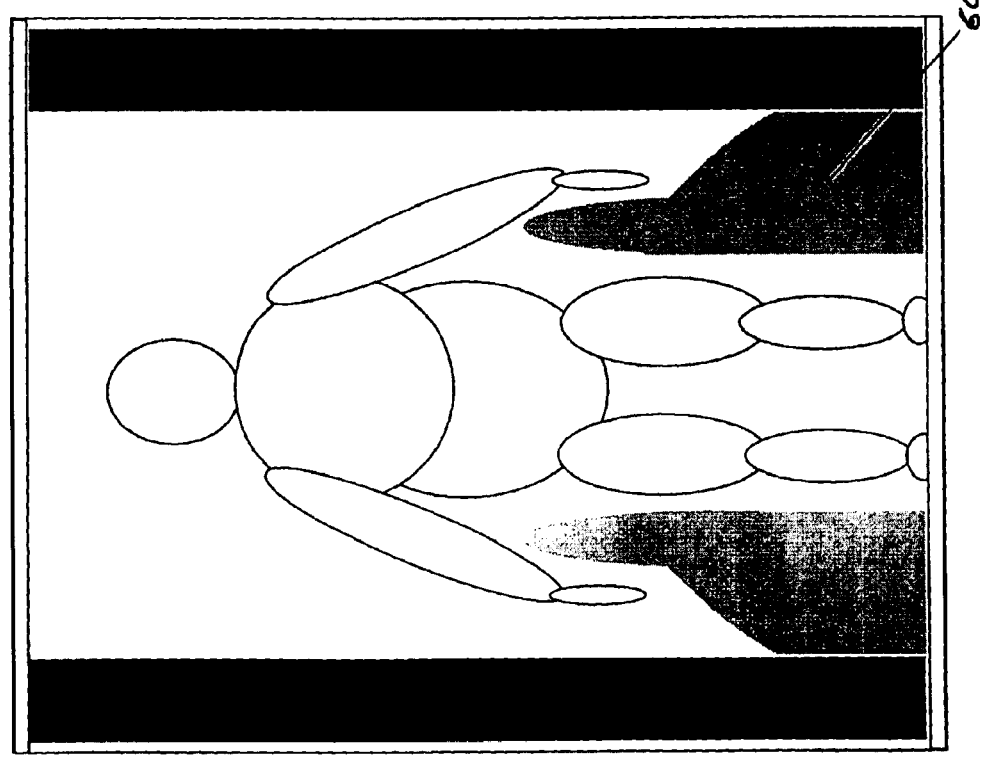
FIG. 5 shows a person passing through a screening portal.
Figure 7A:
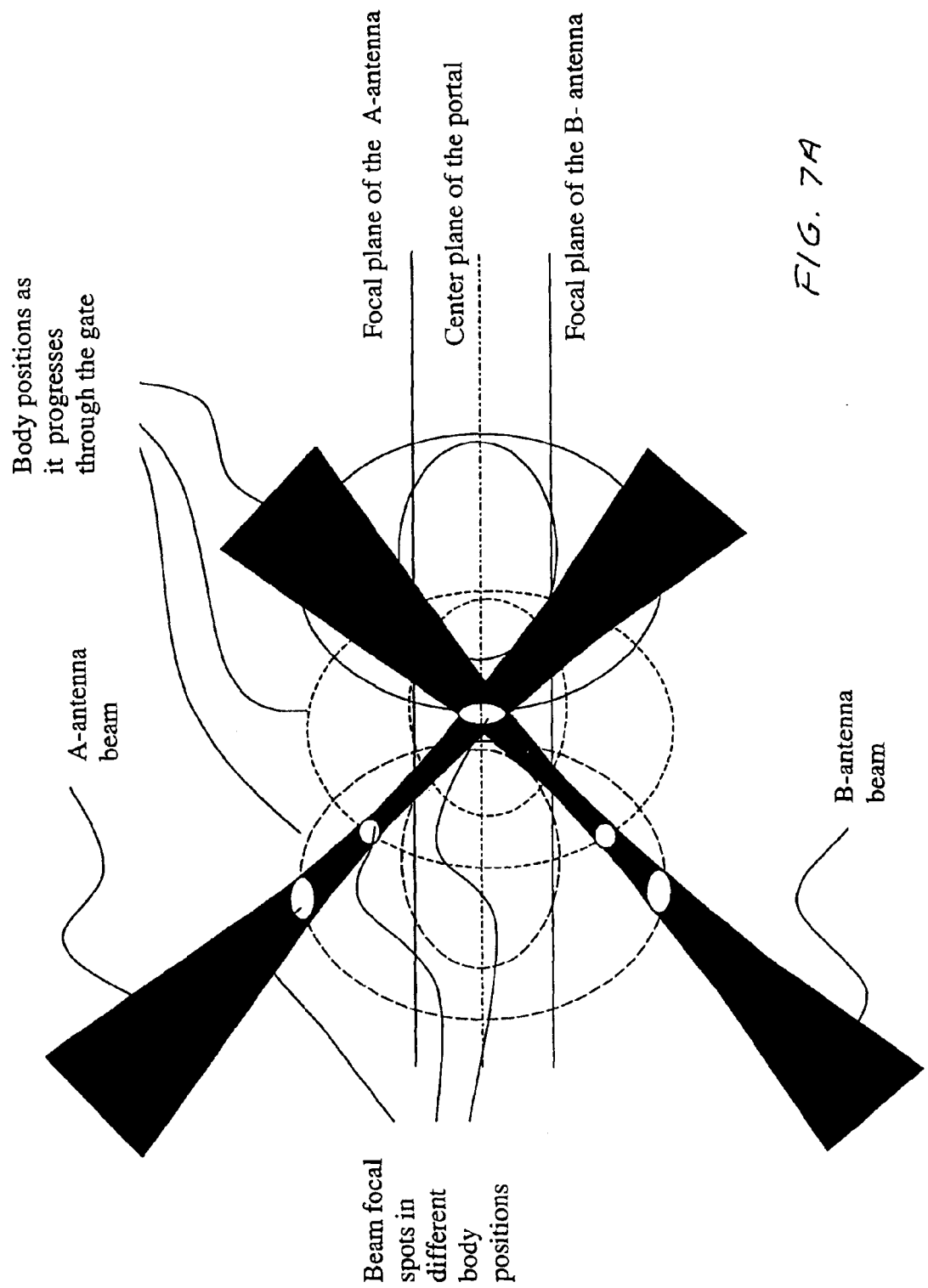
FIGS. 7A and 7B show the relationship between resolution and distance between antenna and target.
Figure 7B:
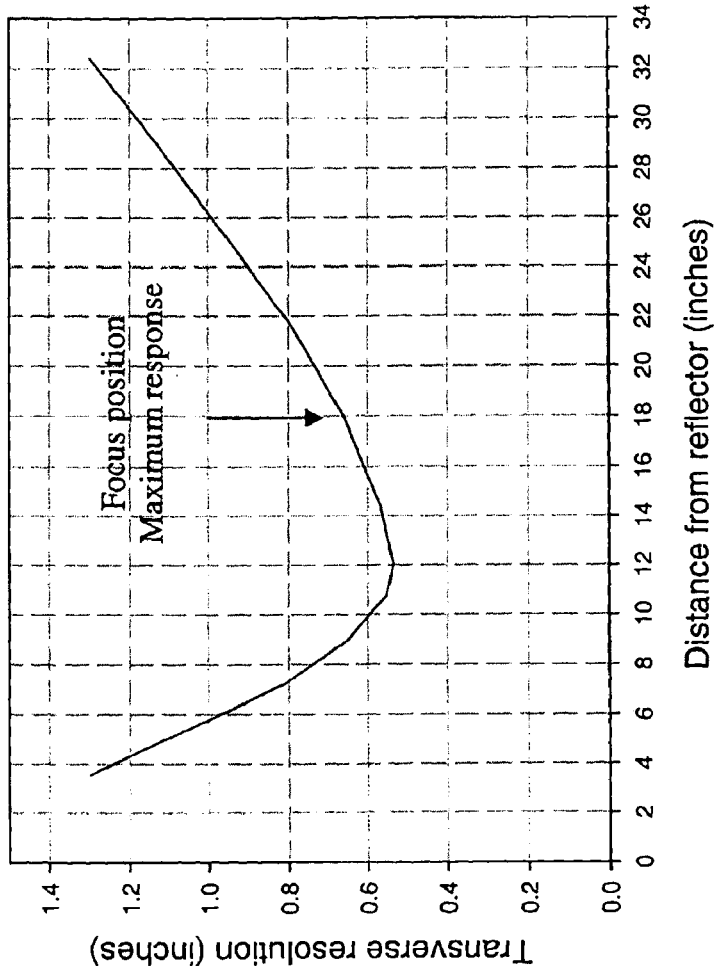

Persons skilled in the art of contraband detection will recognize that many modifications can be made to the examples presented above. For example, instead of having the person pass through the portal on a horizontal escalator as described above, the person could be required to walk through the portal at a designated pace such as about ¼ the normal walking speed. A millimeter wave transparent barrier 60 can be placed in the portal as shown in FIGS. 5 and 6 in order to assure the proper positioning of the persons relative to the antenna elements. Various tradeoffs are possible in the selection of the focal position of the antenna elements. In the system described an 18-inch focus was specified. Positioning the antenna optically farther away from the persons being screened and increasing the focal length can provide greater depth of focus of the antenna elements. This can be done with mirrors 61 as shown in FIG. 6 to keep the unit compact. In FIG. 7 an estimate is provided of the approximate transverse resolution of the scanner as a function of distance of the between the surface being imaged and the antenna elements.

While the present invention has been described above in terms of particular embodiments, persons skilled in the art will recognize that many other changes may be made. For example, infrared or visible cameras synchronized with the millimeter wave screener may be adapted to provide correlated identity and reference information. Better resolution could be achieved by providing automatic focusing of the antenna elements. Alternatively, additional sets of elements could be provided with various focal lengths with processor software programmed to select the best focus for each portion of the target person as he/she passes through the portal. Increasing the size of the antenna could also improve the resolution. The person passing through the portal could be rotated before a single stack or they could be rotated before the four stacks. For applications where plenty of time is available a single element or fewer elements could be scanned across a person being screened, either automatically or by hand. Modifications to the amplifier shown in FIG. 4 could be made but preferably gains of at least 50 dB should be provided. Therefore, the scope of the present invention should be determined by the appended claims and their legal equivalents.

We claim:

1. A millimeter wave imaging system comprising:
  A) at least one millimeter wave frequency scanning antenna for collecting frequency dependent beams of millimeter wave radiation from a narrow one-dimensional field of view;
  B) a millimeter wave amplifier for amplifying at the collected frequencies said millimeter wave radiation;
  C) a beamformer for separating said amplified collected radiation to produce frequency dependent signals corresponding to said frequency dependent beams, said beamformer comprising:
    1) a plurality of delay lines,
    2) a millimeter wave lens, and
    3) a plurality of millimeter wave power detectors; and
  D) a sampling circuit for reading out frequency dependent signals to produce a one-dimensional image of the antenna field of view.

2. The imaging system as in claim 1 and also comprising a focusing means for focusing said frequency-scanning antenna.

3. The imaging system as in claim 2 wherein said focusing means comprises a cylindrical reflector and a cylindrical lens.

4. The imaging system as in claim 1 wherein said millimeter wave amplifier comprises three MMIC amplifiers fabricated on an indium phosphate substrate and a band pass filter.

5. The imaging system as in claim 4 wherein said amplifier comprises a co-planar waveguide design.

6. The imaging system as in claim 4 wherein said amplifier provides gains of at least 50 dB.

7. The imaging system as in claim 1 wherein said delay lines are comprised of etched copper to create circuit patterns of varying lengths.

8. The imaging system as in claim 7 wherein said delay lines define copper surfaces having surface roughness less than 300 nanometers.

9. A portal contraband screener comprising a plurality of millimeter wave sensors, each of said plurality of millimeter wave sensors comprising:
   A) at least one millimeter wave frequency scanning antenna for collecting frequency dependent beams of millimeter wave radiation from a narrow one-dimensional field of view;
   B) a millimeter wave amplifier for amplifying at the collected frequencies said millimeter wave radiation;
   C) a beamformer for separating said amplified collected radiation to produce frequency dependent signals corresponding to said frequency dependent beams, said beamformer comprising:
      1) a plurality of delay lines,
      2) a millimeter wave lens, and
      3) a plurality of millimeter wave power detectors; and
   D) a sampling circuit for reading out frequency dependent signals to produce a one-dimensional image of the antenna field of view.

10. The screener as in claim 9 wherein each of said plurality of millimeter wave sensors also comprises a focusing means for focusing said frequency-scanning antenna.

11. The screener as in claim 10 wherein said focusing means comprises a cylindrical reflector and a cylindrical lens.

12. The screener as in claim 11 wherein each of said millimeter wave amplifiers comprises three MMIC amplifiers fabricated on an indium phosphate substrate and a band pass filter.

13. The screener as in claim 12 wherein said amplifier comprises a co-planar waveguide design.

14. The screener as in claim 12 wherein said amplifier provides gains of at least 50 dB.

15. The screener as in claim 9 wherein each of said delay lines are comprised of etched copper to create circuit patterns of varying lengths.

16. The screener as in claim 15 wherein said delay lines define copper surfaces having surface roughness less than 300 nanometers.

17. A portal contraband screener comprising a plurality of millimeter wave sensors, each of said plurality of millimeter wave sensors comprising:
   A) at least one millimeter wave frequency scanning antenna for collecting frequency dependent beams of millimeter wave radiation from a narrow one-dimensional field of view;
   B) a fast switch for calibration;
   C) a millimeter wave amplifier for amplifying at the collected frequencies said millimeter wave radiation, said amplifier comprising at least three MMIC amplifiers fabricated on an indium phosphate substrate and a band pass filter;
   D) a beamformer for separating said amplified collected radiation to produce frequency dependent signals corresponding to said frequency dependent beams, said beamformer comprising:
      1) a plurality of delay lines,
      2) a millimeter wave lens, and
      3) a plurality of millimeter wave power detectors; and
   E) a sampling circuit for reading out frequency dependent signals to produce a one-dimensional image of the antenna field of view,
   F) focusing means for focusing the sensor.

18. The screener as in claim 17 wherein said focusing means comprises a cylindrical reflector and a cylindrical lens.

19. The screener as in claim 17 wherein said amplifier comprises a co-planar waveguide design.

20. The screener as in claim 17 wherein said amplifier provides gains of at least 50 dB.

21. The screener as in claim 17 wherein each of said delay lines are comprised of etched copper to create circuit patterns of varying lengths.

22. The screener as in claim 21 wherein said delay lines define copper surfaces having surface roughness less than 300 nanometers.

23. The screener as in claim 17 wherein said plurality of sensors is arranged in four stacks each stack comprising at least 16 sensors.

* * * * *